United States Patent [19]

Cleary

[11] 4,174,516
[45] Nov. 13, 1979

[54] ALARM DEVICE

[75] Inventor: Mark R. Cleary, Omaha, Nebr.

[73] Assignee: Jubilee Manufacturing Co., Omaha, Nebr.

[21] Appl. No.: 856,960

[22] Filed: Dec. 5, 1977

[51] Int. Cl.² .................. B60R 25/10; G08B 13/08
[52] U.S. Cl. .............................. 340/63; 340/541; 307/10 AT
[58] Field of Search .............. 340/63, 64, 274 R, 276, 340/541, 69; 307/10 AT; 180/114

[56] References Cited

U.S. PATENT DOCUMENTS

| 3,531,793 | 9/1970 | Shottenfeld | 340/276 |
| 3,533,064 | 10/1970 | Perelman | 340/63 |
| 4,038,635 | 7/1977 | Schotz | 340/63 |

Primary Examiner—Alvin H. Waring
Attorney, Agent, or Firm—Henderson & Sturm

[57] ABSTRACT

An alarm device for the deterrence of burglary and theft from an automobile is disclosed. The device provides a voltage responsive trigger, a digital activating circuit and a "high-low" siren output. The device also includes arming circuits for arming and disarming the device, various delay and timing cicruits and means for connection to present day automobile electrical systems.

14 Claims, 2 Drawing Figures

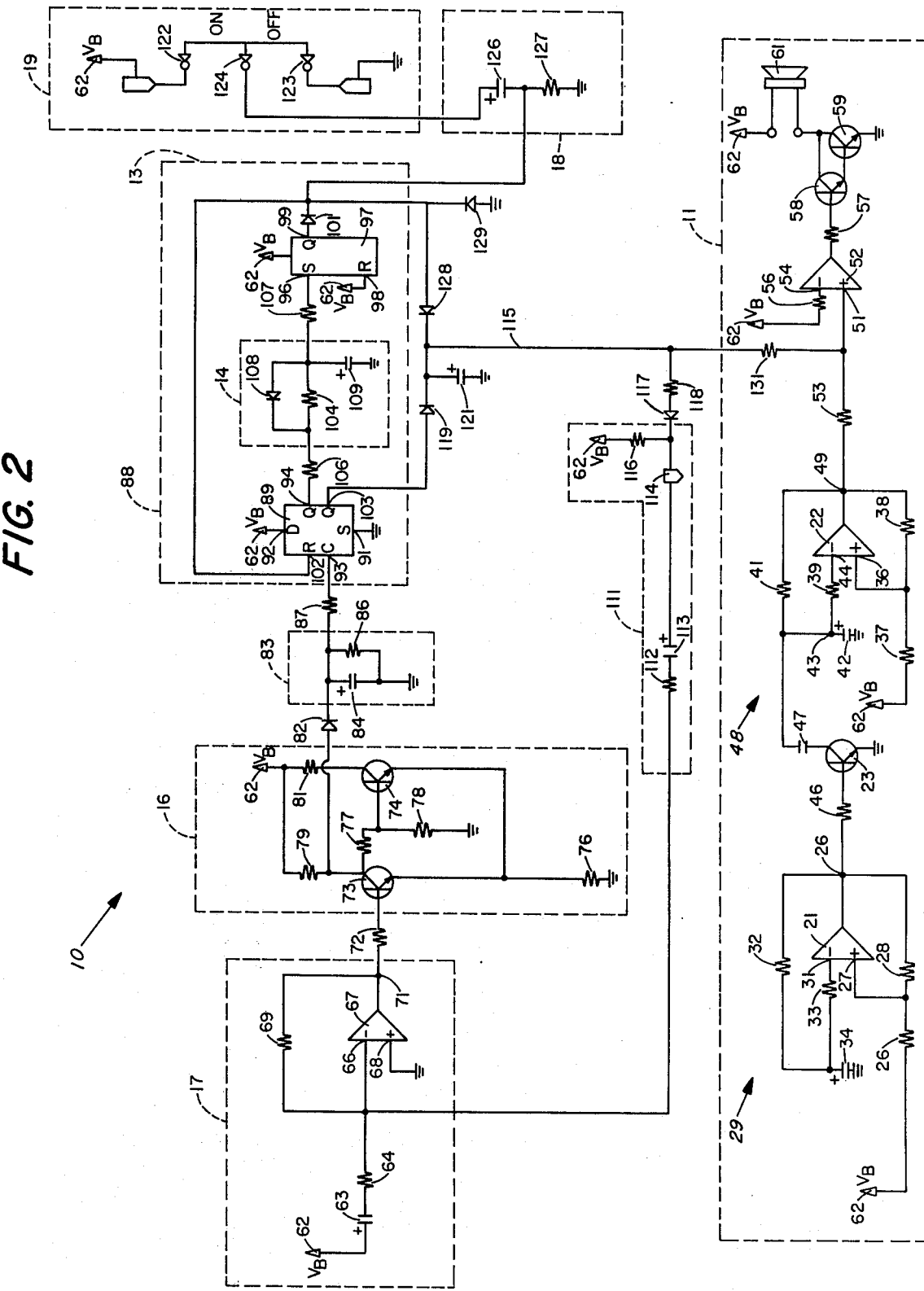

ALARM DEVICE

BACKGROUND OF THE INVENTION

With the high number of auto larceny incidents, the search has continued for a reliable and effective alarm system for use with automobiles. There are numerous American patents in this area, as exemplified by Raschke, U.S. Pat. No. 3,579,233; Teich, U.S. Pat. No. 3,956,732; Carlson, U.S. Pat. No. 3,852,614 and Rubin, U.S. Pat. No. 3,422,398. The devices described in the above patents all disclose some means to protect an automobile against various unauthorized invasions. Of particular interest is Fischer, U.S. Pat. No. 3,794,967, wherein the invention detects transient changes in the automobile electrical system. A transistor latching circuit operates a horn in response to such transients. Fischer's teaching thereby points toward an improved means for activating an automobile intrusion alarm.

The prior art contains numerous problems, however in providing an effective alarm. Once activated, many systems, including Fischer, sound an alarm until manually disengaged, or the auto battery wears down, both eventualities of considerable inconvenience. Those devices that do automatically disengage often do not rearm themselves, or if they do, their trigger means may be circumvented if an unauthorized person remained in the auto. The devices often rely on complex circuitry that places no emphasis or reliance on state-of-the-art components. The reverse is also true, with some devices containing expensive components that are just as inefficient from a design point of view as the more remedial circuits.

In addition, it must be remembered that automobile alarm devices are rarely if ever factory installed by the automobile manufacturers. Rather, the devices must be installed after the auto is sold. Many devices overlook this particular aspect and are consequently difficult to install.

Therefore, a need exists for a conveniently installed, effective automobile alarm device that is highly efficient and therefore inexpensive.

SUMMARY OF THE INVENTION

It is a primary object of this invention, to provide an alarm device for use with automobiles.

It is yet another object of this invention to provide an alarm device that will be responsive to a variety of trigger means.

It is another object of this invention to provide an alarm device that includes an alternating two-tone siren.

It is another object of this invention to provide an alarm device that is responsive to transient variances in the potential of the automobile electrical system.

It is another object of this invention to provide an alarm device that makes use of both solid state devices and integrated circuit devices.

It is yet another object of this invention to provide an alarm device that, once activated, will automatically terminate after a certain period of time and rearm.

It is another object of this invention to provide an alarm device that will allow a brief delay before arming itself so that the operator may leave the car without actuating the alarm.

It is yet another object of this invention to provide an alarm device that will allow a brief delay, once triggered, before sounding to allow an authorized person time to disarm the alarm device.

It is yet still another object of this invention to provide an alarm device that will serve to protect the guarded automobile and deter theft, and simultaneously protect the automobile battery from being electrically depleted.

Another object of this invention is to provide an alarm device that is inexpensive to manufacture, durable of construction and highly effective in use.

BRIEF DESCRIPTION OF THE DRAWINGS

The objects, features and advantages of the present invention will become more apparent upon referring to the following specification and the accompanying drawings in which:

FIG. 2 is a schematic diagram of the circuit contained in the alarm system showing the electrical connections and components thereof.

DESCRIPTION OF THE PREFERRED EMBODIMENT

Figure 1:
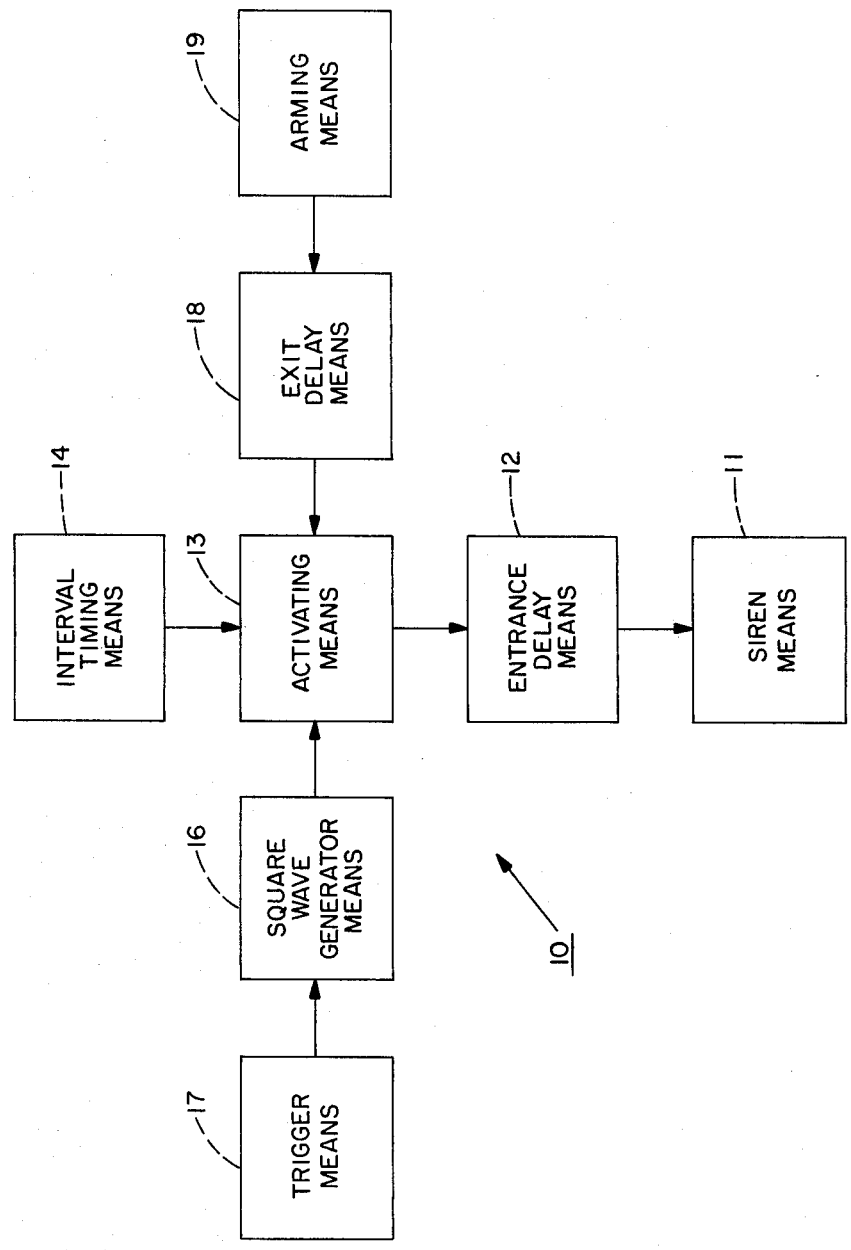
FIG. 1 is a block diagram of the alarm system showing the logical function thereof.

Referring now to the drawings, and in particular to FIG. 1, the device is seen generally as depicted by numeral 10. More specifically, the device 10 includes a siren means 11, entrance delay means 12, activating means 13, interval timing means 14, square wave generating means 16, trigger means 17, exit delay means 18, and arming means 19. All power supply connections noted hereafter are to an automobile battery (not shown). The siren means 11 includes a first operational amplifier 21 and a second operational amplifier 22 operating conjunctively with the transistor 23 and other biasing and feedback circuitry as shown in FIG. 2.

To elaborate, in the first operational amplifier 21, the non-inverting input of the operational amplifier 21 is positively biased through a 10 mega ohm resistor 24. Positive feedback is provided between the output 26 and the non-inverting input 27 through a second 10 mega ohm resistor 28. Negative feedback is provided between the output 26 and the inverting input 31 of the first operational amplifier 21 through a 390 kilo ohm feedback resistor 32 and a 3 mega ohm input resistor 33. The junction point between the feedback resistor 32 and input resistor 33 is grounded through an electrolytic capacitor 34. The capacitor 34 biases the inverting input 31 of the first operational amplifier 21 to ensure a proper rate of oscillation.

The second operational amplifier 22 is disposed within a similar circuit configuration as that described above. The non-inverting input 36 is forward biased through a 10 mega ohm resistor 37, and positive feedback is achieved through another 10 mega ohm resistor 38. The inverting input is also tied to a 3 mega ohm input resistor 39 as in the circuit above, but the negative feedback resistor 41 is of a lesser resistance; i.e. 4.7 kilo ohms. An electrolytic capacitor 42 tied to ground is connected at the electrical junction 43 between the negative feedback resistor 41 and the negative input resistor 39.

The two operational amplifiers 21 and 22 are electrically joined. The output 26 of the first operational amplifier 21 is connected to the inverting input 44 of the second operational amplifier 22 by a transistor switch 23. Specifically, the output 26 of the first operational amplifer 21 is routed via 10 kilo ohm resistor 46 into the base of the transistor 23, the emitter of which is tied directly to ground. The collector of transistor 23 is connected to a 0.07 micro farad capacitor 47. Capacitor 47 is then connected to the junction point 43 between the negative feedback resistor 41 and the negative input resistor 39 of the second operational amplifier circuit 48. At the values disclosed above, the siren circuit output frequency will vary between approximately 800 hz and 1200 hz, thereby producing a "hi-lo" siren noise.

Specifically, the second operational amplifier 22 will produce "high" and "low" frequencies, and the first operational amplifier 21 will control the rate at which the second operational amplifier 22 switches between "high" and "low". The first operational amplifier 21 will oscillate, turning the transistor switch 23 on and off, which will in turn switch a capacitor 47 on and off with respect to the second operational amplifier circuit 48 thereby creating "high" or "low" frequencies of oscillation. The ultimate output of the two operational amplifiers 21 and 22 is a square wave that varies between the two "high/low" frequencies.

The output 49 of the second operational amplifier 22 is attached to the inverting input 51 of a third operational amplifier 52 by a 330 kilo ohm resistor 53. The non-inverting input 54 of the third operational amplifier 52 is positively biased through an 820 kilo ohm resistor 56. The third operational amplifier 52 transmits any variance in potential appearing across the two input terminals 51 and 54. This signal is tied through a 620 ohm resistor 57 to the base of a second transistor 58 that is arranged in a Darlington connection with the third transistor 59. In such a Darlington connection, the collectors of the two transistors 58 and 59 are tied together, and the emitter of the second transistor 58 is tied to the base of the third transistor 59. In addition to the beneficial gain aspects, the high input impedance inherent to such a combination makes this transistor configuration particularly appropriate as the main drive element behind the loudspeaker 61. The loudspeaker 61 is connected between the power supply 62 and the collectors of the two paired transistors 58 and 59, and completes the siren means.

A triggering means 17 is included that is responsive to any minute variations in the potential of the guarded automobile's electrical system, such as when the courtesy light (not shown) or the radio (not shown) is switched on. This voltage sensitive trigger means 17 includes an electrolytic capacitor 63 tied at its positive end to the automobile power supply 62. The remaining lead is connected via a 47 kilo ohm resistor 64 to the inverting input 66 of a fourth operational amplifier 67, the non-inverting input 68 of which is grounded. Negative feedback is provided by a 10 mega ohm resistor 69 affixed between the output 71 of the fourth operational amplifier 67 and the inverting input 66 thereof. The output 71 is also tied via a 10 kilo ohm resistor 72 to the base of a fourth transistor 73 and a fifth transistor 74, the transistors being combined to form a Schmidt trigger. The Schmidt trigger is realized first by tieing the emitters of both transistors 73 and 74 together and routing them through a 110 ohm resistor 76 to ground. The collector of the fourth transistor 73 is connected to the base of the fifth transistor 74 by a 10 kilo ohm resistor 77. A second 10 kilo ohm resistor 78 is affixed between the base of the fifth transistor 74 and ground. The collector of each transistor 73 and 74 is also tied to the power supply 62 via 1.2 kilo ohm resistors 79 and 81. An output signal is obtained from the collector of the fourth transistor 73 and is directed via a diode 82 past RC combination 83 consisting of a 0.1 micro farad capacitor 84 in parallel with a 1.2 mega ohm resistor 86, wherein both components are tied to ground.

The operation of the above voltage responsive trigger means 17 may be disclosed as follows. The electrolytic capacitor 63 first charges and becomes stable. At the first drain of potential from the auto battery (not shown), such as when the headlights (not shown) or a courtesy light (not shown) are switched on, the capacitor 63 will discharge. The discharging capacitor 63 results in a slowly decaying voltage spike that is greatly amplified by the fourth operational amplifier 67. This voltage spike is converted by the Schmidt trigger into a single pulse inverted square wave. The RC combination 83 is provided to trap non-critical voltage variations such as those created by an automobile clock (not shown) and thereby prevent unwarranted soundings of the siren means 11.

The squared wave from the voltage responsive trigger is directed via 1.2 mega ohm resistor 87 into an activating means 88 having generally two flip-flop devices. The first flip-flop 89 is a D-type SR flip-flop, wherein the Set input 91 is tied to ground, and the D-line 92 is tied to the automobile power supply 62. The squared wave is introduced through the Clock input 93 of the D-type flip-flop 89. The output 94 of the D-type flip-flop 89 is operably connected to the Set input 96 of the second flip-flop 97. The reset input 98 of the second flip-flop 97 is permanently secured to the power supply 62. The output 99 of the second flip-flop 97 is routed through a diode 101 and back to the reset input 102 of the D-type flip-flop 89. The output Q 94 of the D-type flip-flop 89 is connected to the Set input 96 of the second flip-flop 97 through an interval timing means 14 by which the Set input 96 at the second flip-flop 97 is delayed in a manner described below.

While the Q output 99 of the second flip-flop 97 is delayed the $\overline{Q}$ 103 output of the D-type flip-flop 89 activates the siren means 11 through the entrance delay means 12 to be described below. The $\overline{Q}$ 103 output of the D-type flip-flop 89 remains "high" until the interval timing means 14 is operative to activate the second flip-flop 97 at which time the D-type flip-flop 89 is reset and the activating means 13 is turned off.

As disclosed above, the duration of the activating means 13 is controlled by the interval delay means 14 affixed between the output 94 of the D-type flip-flop 89 and the Set input 96 of the second flip-flop 97. Specifically, a 10 kilo ohm resistor 104, a 3 mega ohm resistor 106, and a 1 mega ohm resistor 107 are connected in series, with the 10 kilo ohm resistor 104 being further tied in parallel with a diode 108. An electrolytic capacitor 109 attached to ground is connected at the junction point between the 10 kilo ohm resistor 104 and a 1 mega ohm resistor 107, and completes the interval timing means 14. It is the charge time of the capacitor 109 in combination with the 10 kilo ohm resistor 104 that determines the duration of the siren blast (approximately 7 minutes).

An auxiliary trigger means 111 is also provided for in the preferred embodiment. A connection is made from the inverting input 66 of the fourth operational amplifier 67 via a 10 kilo ohm resistor 112 and a 0.1 micro farad capacitor 113 to a signal plug 114. The signal plug 114 is tied to the power supply 62 via a 10 kilo ohm resistor 116 and also to a command line 115 by a diode 117 and a 4.7 kilo ohm resistor 118. Various triggering means may be connected to the ground signal plug 114, such as pressure sensitive switches (not shown) or an operator controlled "panic" or test switch (also not shown).

An entry delay time is provided to allow an authorized operator to enter the automobile and disarm the device before the alarm sounds. To provide the delay a connection is made via a diode 119 between the $\overline{Q}$ 103 output of the D-type flip-flop 89 and the command line 115 wherein an electrolytic capacitor 121 is further attached between the diode-command line junction and ground. The decay characteristics of the capacitor 121 dictate the length of time the entry delay will be effective (approximately 16 seconds).

The arming switch and exit delay will now be disclosed. The arming means 19 itself has an "on" node 122 tied to the power supply 62, and an "off" node 123 grounded. The central common node 124 is attached to a junction point between the power supply 62 and an electrolytic capacitor 126. The backside of this capacitor 126 is grounded via resistor 127 and is also connected via diode 128 to the command line 115. The cathode side of another diode 129 is also connected to the backside of the capacitor 126, the anode side of the diode 129 being grounded. Finally, the cathode side of the diode 101 is connected to the output 99 of the second flip-flop 97 and is also connected to the backside of the capacitor 126. It is the charge time of capacitor 126 in series with the entry delay capacitor 121 which dictates the length of exit time allowed, once the unit is armed.

Additionally, it may be seen that the command line 115 is connected between the positive side of the entry capacitor 121 and the inverting input 51 of the third operational amplifier 52 via a 330 kilo ohm resistor 131.

The operation of the device 10 will now be disclosed. When leaving the protected automobile, the operator switches the arming means 19 to the "on" position. By so doing, the two capacitors 126 and 121 are charged in series. When capacitors 126 and 121 are fully charged, the device 10 is armed. It is the charge time of the two capacitors 126 and 121 that allows the operator to leave the automobile without activating the alarm. In the armed stated, the Q output 103 of the D-type flip-flip 89 is "high", and it is this constant "high" signal that prevents the third operational amplifier 52 from sounding the loudspeaker 61. When the car door is opened and the dome light (not shown) is activated, causing a general voltage drop in the automobile electrical supply 62, the following occurs: the trigger capacitor 63 discharges and the discharge is amplified by the fourth operational amplifier 67. This amplified "spike" signal is squared by the square wave generating means 16 and sent to the activating means 13. At the activating means 13, the D-type flip-flop 89 sets and $\overline{Q}$ 103 is set low. Capacitor 121 then begins to discharge. When capacitor 121 is fully discharged, the third operational amplifier 52 is activated and the loundspeaker 61 sounds. Meanwhile, the interval timing means capacitor 109 is charging. When fully charged the set input 96 of the second flip-flop 97 will be "high" thereby resulting in a "high" output at Q 99. This will reset the D-type flip-flop 89 and the third operational amplifier 52 will be turned off. The device 10 is then ready for continued electronic surveillance.

Other circuit components having different values and operating specifications may be employed within the scope of teaching of this invention. The choice of components with differing values and operating specifications is, of course, well within the skill of those in the art, and this teaching is not intended to be limited to the specific components mentioned.

Obviously, since many modifications and variations of the present invention are possible in light of the above teachings, it is also to be understood that, within the scope of the appended claims, the invention may be practiced otherwise then as specifically described.

I claim:
1. An alarm device for use in conjunction with automobiles having electrical systems, said alarm device comprising:
    (a) electric power connection means for connecting the device to the automobile electrical system;
    (b) a first trigger means operably connected to the electrical power means, said first trigger means responsive to voltage variations and capable of producing electrical signal in response to such voltage variations;
    (c) square wave generating means for converting electrical signal of the first trigger means into a square wave signal, said square wave generating means electrically connected to the first trigger means;
    (d) siren means for sounding a siren in response to said activating means and electrically connected to said activating means, said siren means having:
        a first operational amplifier circuit including an inverting and non-inverting input, and an output;
        a second operational amplifier circuit including an inverting and non-inverting input, and an output;
        a first transistor having a base, emitter, and collector, said first transistor electrically connected between said first operational amplifier circuit and said second operational amplifier circuit;
        and positive voltage biasing means for positively biasing the non-inverting inputs of said first and second operational circuits, wherein the output of said first operational amplifier circuit is connected to the base of said first transistor, and the collector of said first transistor is connected to the inverting input of said second operational amplifier circuit;
    (e) activating means responsive to the square wave signal for activating said siren means, said activating means electrically connected between said square wave means and said siren means;
    (f) arming means for arming and dearming said first trigger means, and operably connected to said first trigger means;
    (g) a first timing means for deactivating said siren means at some preset period beyond the time when said siren means is activated, said first timing means electrically connected to the siren means;
    (h) a second timing means providing a delay time interval between the time when the arming means is activated, said second timing means electrically connected to the first trigger means; and
    (i) a third timing means providing a delay interval between the time said activating means produces an activating signal and the time set siren means is activated, said third timing means electrically connected to the activating means.

2. An alarm device as described in claim 1 wherein:
    said first operational amplifier circuit includes a first operational amplifier having an inverting and non-inverting input and an output, a first resistor connected between the output and the inverting input of said first operational amplfier, a second resistor connected between the output and the non-inverting input of said first operational amplifier and a first capacitor operably attached between the inverting input of said first operational amplifier and ground potential;

said second operational amplifier circuit includes a second operational amplifier having an inverting and non-inverting input and an output, a third resistor connected between the output and the inverting input of said second operational amplifier, a fourth resistor connected between the output and the non-inverting input of said second operational amplifier and a second capacitor operably attached between the inverting input of said second operational amplifier and ground potential; and a third capacitor operably connected between the collector of said first transistor and the inverting input of said second operational amplifier circuit.

3. An alarm device as described in claim 2 wherein said siren means further comprises:

a third operational amplifier having an inverting and a non-inverting input and an output;

a second and third transistor, each having a base, collector and emitter; and a horn, wherein the inverting input of said third operational amplifir is operably connected to the output of said second operational amplifier, the non-inverting input of said third operational amplifier is operably connected to said means of supplying electric power, the output of said third operational amplifier is operably connected to the base of said second transistor, the collector of said second transistor is connected to the collector of said third transistor, the emitter of said second transistor is connected to the base of said third transistor, the emitter of said third transistor is connected to ground potential, and said horn is connected between said means of supplying electric power and the collector of said third transistor.

4. An alarm device as described in claim 3 wherein said amplifying means comprises a fourth operational amplifier having an inverting and non-inverting input and an output, and a fifth resistor, wherein said fifth resistor is connected between the output and the inverting input of said fourth operational amplifier.

5. An alarm device as described in claim 4 wherein said first trigger means comprises a fourth capacitor and a sixth resistor connected between said fourth capacitor and the inverting input of said fourth operational amplifier.

6. An alarm device as described in claim 5 wherein said means for converting the electrical signal into a square wave signal comprises a Schmidt trigger.

7. An alarm device as described in claim 6 wherein said Schmidt trigger comprises:

fourth and fifth transistors, each having a base, collector and emitter;

a seventh, eighth and ninth resistor, wherein the emitters of said fourth and fifth transistors are connected together, the seventh resistor is connected between the collector of said fourth transistor and the base of said fifth transistor, the eighth resistor is attached to the collector of the fourth transistor, the ninth resistor is attached to the collector of the fifth transistor, and the eighth and ninth resistors are connected together.

8. An alarm device as described in claim 7 wherein said activating means comprises:

a D-type flip-flop having a set and reset input, a clock input a Q output, A $\overline{Q}$ output and a delay node;

an SR flip-flop having a set and reset input and a Q output, wherein the clock input of said D-type flip-flop is operably attached to the collector of said fourth transistor, the delay node is connected to said means of supplying electric power, the Q output of the D-type flip-flop is operably attached to the set input of said SR flip-flop, the Q output of said SR flip-flop is connected to the reset input of the D-type flip-flop, the reset input of the SR flip-flop is connected to said means of supplying electric power, and the set input of said D-type flip-flop is connected to ground potential.

9. An alarm device as described in claim 8 wherein said arming means comprises a double pole single throw switch having a common pole, a positively biased pole and a ground potential pole.

10. An alarm device as described in claim 9 wherein said first timing means comprises:

a fifth capacitor; and a tenth resistor, wherein said fifth capacitor is operably connected between the set input of said SR type flip-flop and ground potential, and said tenth resistor is operably connected between the Q output of said D-type flip-flop and the set input of said SR type flip-flop.

11. An alarm device as described in claim 10 wherein said second timing means comprises:

a sixth capacitor; and an eleventh resistor; wherein said sixth capacitor is operably connected between the common pole of said double pole single throw switch and the Q output of said SR type flip-flop, and said eleventh resistor is connected between the Q output of said SR type flip-flop and ground potential.

12. An alarm device as described in claim 11 wherein said third timing means comprises:

a seventh capacitor; and a twelfth resistor, wherein said seventh capacitor is operably connected between the $\overline{Q}$ output of said D-type flip-flop and ground potential, and said twelfth resistor is operably connected between the $\overline{Q}$ output of said D-type flip-flop and the inverting input of said third operational amplifier.

13. An alarm device as described in claim 12 further comprising means for preventing minor transient signals in the electrical system of an automobile to which the alarm device is operably connected from activating said siren means.

14. An alarm device as described in claim 13 wherein said means for preventing minor transient signals comprises:

an eighth capacitor; and a thirteenth resistor, wherein said eighth capacitor and said thirteenth resistor are connected in parallel between the clock input of said D-type flip-flop and ground potential.

* * * * *